United States Patent
Itoga et al.

(10) Patent No.: US 7,413,220 B2
(45) Date of Patent: Aug. 19, 2008

(54) VEHICLE OCCUPANT PROTECTION SYSTEM AND INFLATOR

(75) Inventors: Yasuo Itoga, Hikone (JP); Hiromichi Yoshikawa, Hikone (JP); Masayoshi Kumagai, Ika-Gun (JP)

(73) Assignee: Takata Corporation, Tokyo (JP)

( * ) Notice: Subject to any disclaimer, the term of this patent is extended or adjusted under 35 U.S.C. 154(b) by 440 days.

(21) Appl. No.: 11/044,046

(22) Filed: Jan. 28, 2005

(65) Prior Publication Data

US 2005/0189752 A1 Sep. 1, 2005

Related U.S. Application Data

(60) Provisional application No. 60/547,807, filed on Feb. 27, 2004.

(51) Int. Cl.
*B60R 21/26* (2006.01)
(52) U.S. Cl. .................. 280/742; 280/741; 280/733; 280/729; 180/268
(58) Field of Classification Search .......... 280/741, 280/733, 729, 728.1, 730.2; 180/268
See application file for complete search history.

(56) References Cited

U.S. PATENT DOCUMENTS

| | | | | |
|---|---|---|---|---|
| 3,791,670 A | * | 2/1974 | Lucore et al. | 280/733 |
| 5,445,411 A | * | 8/1995 | Kamiyama et al. | 280/733 |
| 5,765,869 A | * | 6/1998 | Huber | 280/807 |
| 5,820,162 A | | 10/1998 | Fink | |
| 5,947,514 A | | 9/1999 | Keller et al. | |
| 6,062,597 A | * | 5/2000 | Suyama | 280/733 |
| 6,293,581 B1 | * | 9/2001 | Saita et al. | 280/730.2 |
| 6,349,964 B1 | * | 2/2002 | Acker et al. | 280/730.2 |
| 6,425,602 B1 | | 7/2002 | Al-Amin et al. | |
| 6,543,804 B2 | * | 4/2003 | Fischer | 280/730.2 |
| 6,863,298 B2 | * | 3/2005 | Sakai et al. | 280/728.1 |
| 7,063,350 B2 | * | 6/2006 | Steimke et al. | 280/729 |
| 7,086,663 B2 | * | 8/2006 | Honda | 280/730.2 |
| 2001/0011810 A1 | | 8/2001 | Saiguchi et al. | |
| 2002/0125702 A1 | * | 9/2002 | Ohhashi | 280/733 |
| 2003/0030257 A1 | * | 2/2003 | Thomas et al. | 280/730.2 |
| 2003/0160433 A1 | * | 8/2003 | Kumagai et al. | 280/729 |
| 2003/0230872 A1 | * | 12/2003 | Sakai et al. | 280/728.1 |
| 2004/0155436 A1 | * | 8/2004 | Saiguchi et al. | 280/728.1 |
| 2004/0164532 A1 | * | 8/2004 | Heidorn et al. | 280/733 |
| 2005/0189752 A1 | * | 9/2005 | Itoga et al. | 280/741 |
| 2006/0103120 A1 | * | 5/2006 | Kurimoto et al. | 280/730.2 |
| 2006/0208471 A1 | * | 9/2006 | Sundararajan et al. | 280/733 |
| 2006/0284402 A1 | * | 12/2006 | Schramm et al. | 280/741 |
| 2007/0052223 A1 | * | 3/2007 | Parkinson et al. | 280/740 |
| 2007/0063493 A1 | * | 3/2007 | Higuchi et al. | 280/733 |
| 2007/0080526 A1 | * | 4/2007 | Itoga | 280/733 |

(Continued)

FOREIGN PATENT DOCUMENTS

JP 5-229378 9/1993

(Continued)

*Primary Examiner*—Christopher Bottorff
*Assistant Examiner*—Karen Jane J. Amores
(74) *Attorney, Agent, or Firm*—Foley & Lardner LLP

(57) ABSTRACT

An inflator having at least first and second gas outputs and configured to generate gas. The inflator releases the gas through the first gas output with a fist gas flow rats and to release the gas through the second gas output with a second gas flow rate different from the first gas flow rate.

12 Claims, 12 Drawing Sheets

U.S. PATENT DOCUMENTS

2007/0080528 A1* 4/2007 Itoga et al. .................. 280/733

FOREIGN PATENT DOCUMENTS

| JP | 10-217818 | 8/1998 |
| JP | 2002-79861 | 3/2002 |
| JP | 2002-79862 | 3/2002 |
| JP | 2002-79863 | 3/2002 |
| JP | 2002-145002 | 5/2002 |
| JP | 2003-312439 | 11/2003 |

* cited by examiner

VEHICLE OCCUPANT PROTECTION SYSTEM AND INFLATOR

CROSS REFERENCE TO RELATED APPLICATIONS

This application claims priority to and the benefit of U.S. Provisional Application No. 60/547,807, filed Feb. 27, 2004.

Many vehicle occupant protections systems currently exist, including seat belts, front airbags, side airbags, head side airbags, seat airbags and seat belt airbags (such as lap belt air bags ad shoulder belt air bags). For example, Japanese Patent Publication No. 2003-312439 (Incorporated by reference herein) discloses a seat belt comprising a shoulder belt potion having an inflatable airbag BG1 and a lap belt portion having am inflatable airbag BG2.

Typically, airbags are inflated use either a pyrotechnic inflator and/or a high-pressure gas cylinder. One problem with currently available protection systems is that, because each airbag inflation, either the system requires, a) multiple inflators each plumbed to their respective airbags; or b) one inflator plumbed to each airbag. Solution a) may be prohibitively costly, complicated, and unreliable. Solution b) may result in differential inflation rates in each of the airbags and/or one airbag completely inflating before the other airbags have completed inflating. For example, Japanese Patent Publication No. 2002-145002 discloses an occupant crash protection device having a seat airbag connected to the seat and a belt airbag connected to the seat belt where both airbags are connected to a forked connecting portion of a common inflator.

SUMMARY OF INVENTION

The present invention aims to solve at least one or more of these and other problems.

According to an embodiment of the present inventions, an inflator has at least first and second gas outputs, the inflator configured to generate gas and to release the gas though the fast gas output with a first gas flow rate and to release the gas through the second gas output with a second gas flow rate different from the first gas flow rate. The relative gas flow rates from inflator ink may be adjustable.

According to another embodiment of the present invention, a vehicle occupant protection system comprises: an inflator having at least firs and second gas outputs, the inflator configured to generate gas and to release the a through the first gas output with a first gas flow rate and to release the gas through the second gas output with a second gas flow rate different from the first gas flow rate; a first air bag connected to the first gas output; and at least one of a second air bag and a seat belt retractor connected to the second gas output.

It is to be understood that both the foregoing general description and the following detailed description are exemplary and explanatory only, and am not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3b shows a cross section through section B-B of the inflator shown in FIG. 3a.

DETAILED DESCRIPTION

Figure 1:
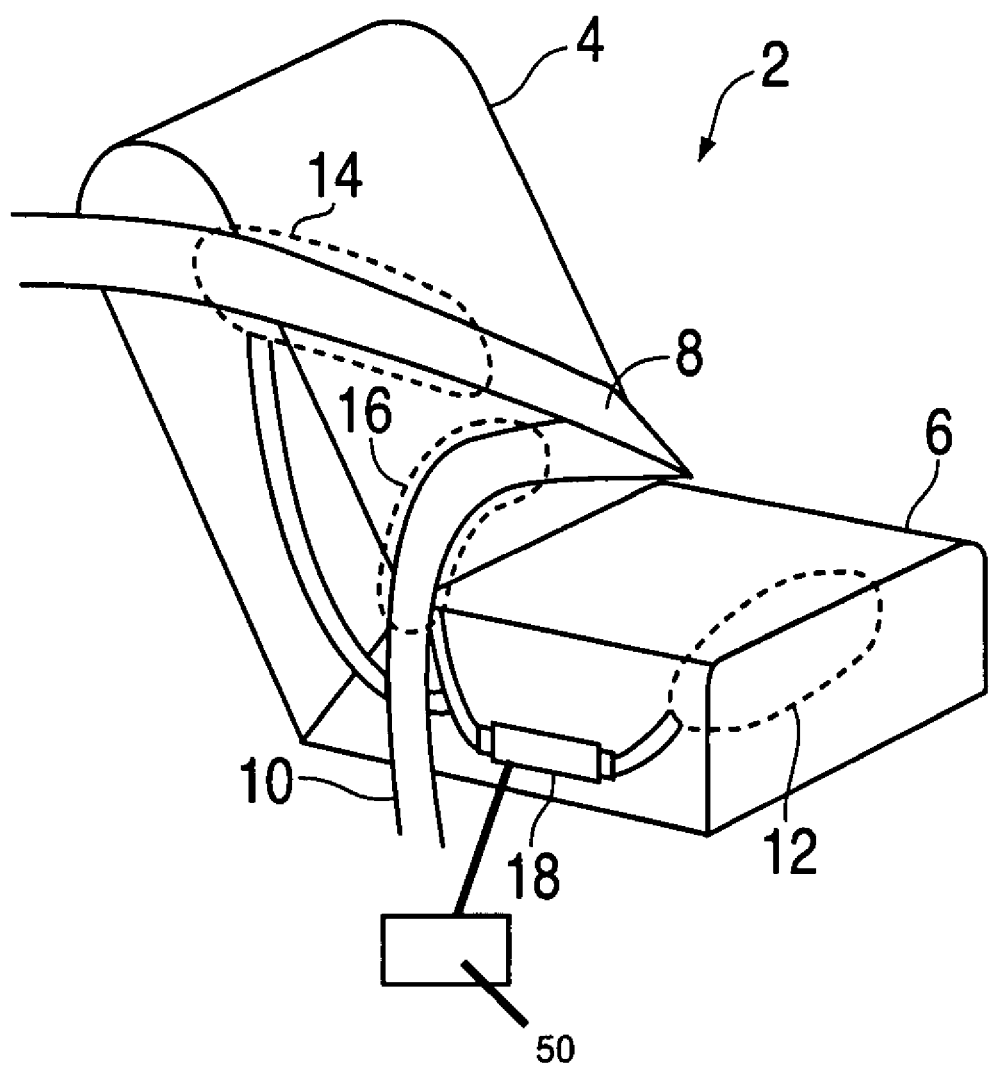
FIG. 1 shows a perspective view of a vehicle seat having a seat airbag, a lap belt airbag, and a shoulder belt airbag according to an embodiment of the present invention.
Figure 7:
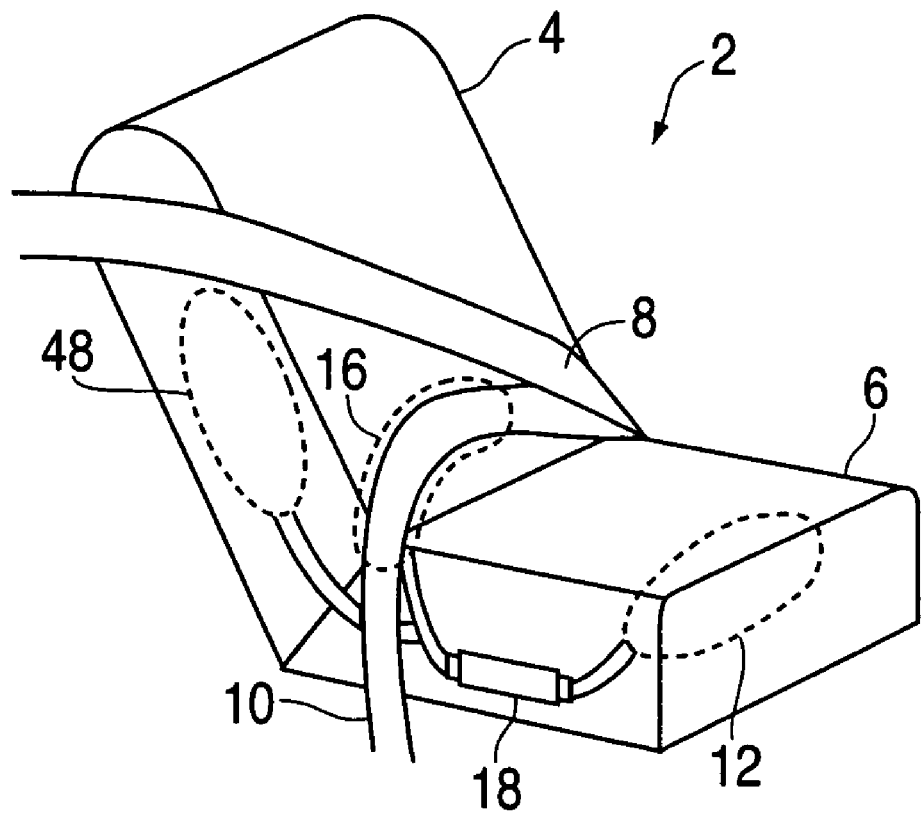
FIG. 7 shows a perspective view of a vehicle seat having a seat airbag, a lap belt airbag, and a side airbag according to an embodiment of the present invention.
Figure 8A:
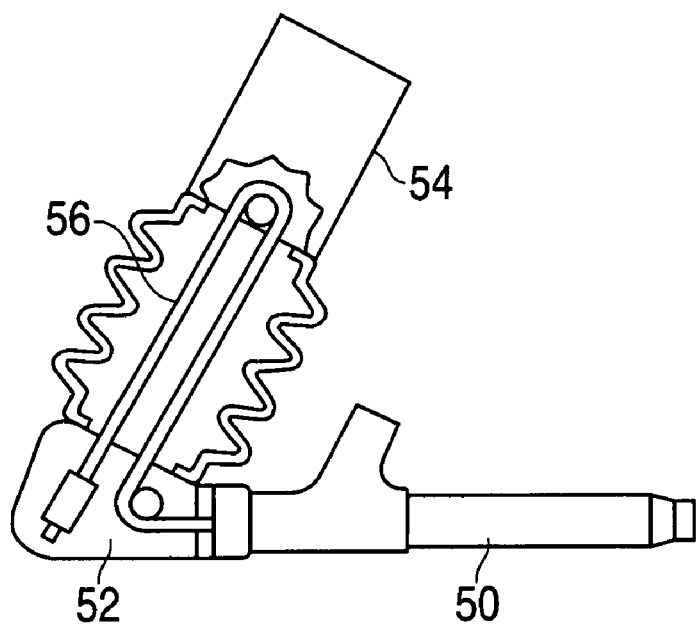
FIGS. 8a and 8b show a scat belt retractor connectable to an inflator of the present invention.
Figure 8B:
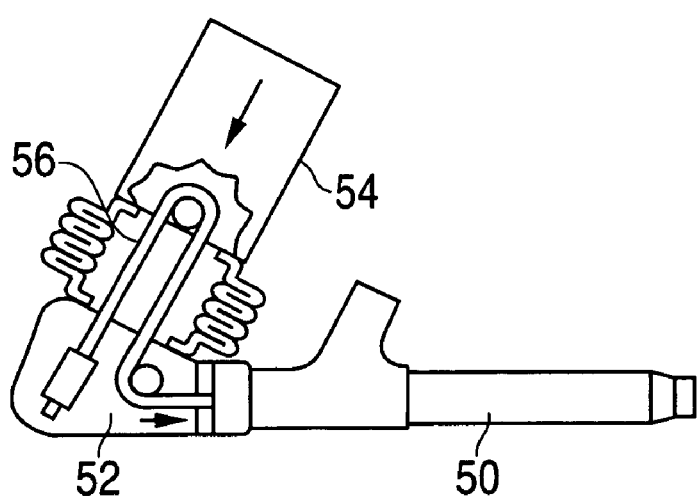

Referring to FIG. 1, a vehicle occupant protection system comprises a seat 2 having a back rest portion 4 and a bottom rest portion 6, a seat belt having a shoulder belt portion 8 and a lap belt portion 10, a seat airbag 12 connected to the bottom rest portion 6, a shoulder belt airbag 14 connected to the shoulder belt portion 8, a lap belt airbag 16 connected to the lap belt portion 10, and an inflator 18 connected to the airbags 12, 14, 16. The system may also include a seat belt retractor 50 (as shown in FIGS. 8a and 8b) configured to retract and tighten the seat belt 8, 10 when actuated by a high pressure gas (such as from a pyrotechnic gas generator or a high-pressure gas tank). The system may also include a side air bag 48 (as shown in FIG. 7) located within a side of the back rest portion 4 or with a vehicle passenger side door (not shown).

The seat airbag 12 is preferably located within or underneath bottom rest portion 6, and is configured to cause an upper portion of the bottom rest portion 6 to rise upward when the seat airbag 12 is inflated by inflated 18. The rising of the upper portion of the bottom rest portion 6 helps prevent a vehicle occupant, who is being restrained by scat belt 8, 10 during a vehicle collision, sliding or submarining underneath the lap belt portion 10. Seat airbags are well known in the art.

The shoulder belt airbag 14 is connected to shoulder belt portion 8 and is preferably covered with a protective fabric or coating (not shown), to protect the vehicle occupant from a burn due to hot gas from the inflator 18 (in the case of a pyrotechnic inflator). The shoulder belt airbag 14 expands upon inflation by inflator 18 so as to distribute the restraint force of the shoulder belt portion 8 over a lager area on the vehicle occupant during a vehicle collision this improving safety and comfort. The lap belt airbag 16 is connected to lap belt portion 10 and is preferably covered with a protective fabric or coating (not shown), to protect the vehicle occupant from a burn due to hot gas from the inflator 18 (in the case of a pyrotechnic inflator). The lap belt airbag 16 expands upon inflation by inflator 18 so as to distribute the restraint force of the lap belt portion 10 over a larger area on the vehicle occupant during a vehicle collision, thus improving safety and comfort. Shoulder belt airbags and lap belt airbags are well known in the art.

Side airbag 48 (FIG. 7) may be located on or within a side of back rest portion 4 of seat 2, or on or within a passenger side door (not shown). Side airbag 48 is configured to expand upon inflation by inflator 48 so as to provide a cushion to restrain lateral motion of a vehicle occupant during a side vehicle collision. Side airbags are well known in the art.

Referring to FIG. 8a, seat belt 8, 10 (as in FIG. 1) is configured to releasably connect to a buckle 54 which is attached to a fixed base portion 52 by a movable cable 56. The base portion 52 is secured to the vehicle floor (not shown). The cable 56 is movably connected to a seat belt retractor 50, which is coded to pull cable 56 upon activation of the inflator 18, so as to retract or pull buckle 54 toward base portion 52, as shown in FIG. 8b. Preferably, seat belt reactor 50 includes a piston movable in a piston chamber (not shown), such that inflation of the seat belt retractor 50 by hot and/or pressurized gas from the inflator 18 causes the piston to pull cable 56 in the direction shown in FIG. 8b. In a preferred embodiment, seat belt retractor 50 is connected to the inflator 18 shown in FIG. 1.

In a preferred embodiment, two or more of the following may be connected to inflator 18: seat airbag 12, Shoulder belt airbag 14, lap belt airbag 16, side airbag 48, and seat belt retractor 50.

Figure 2:
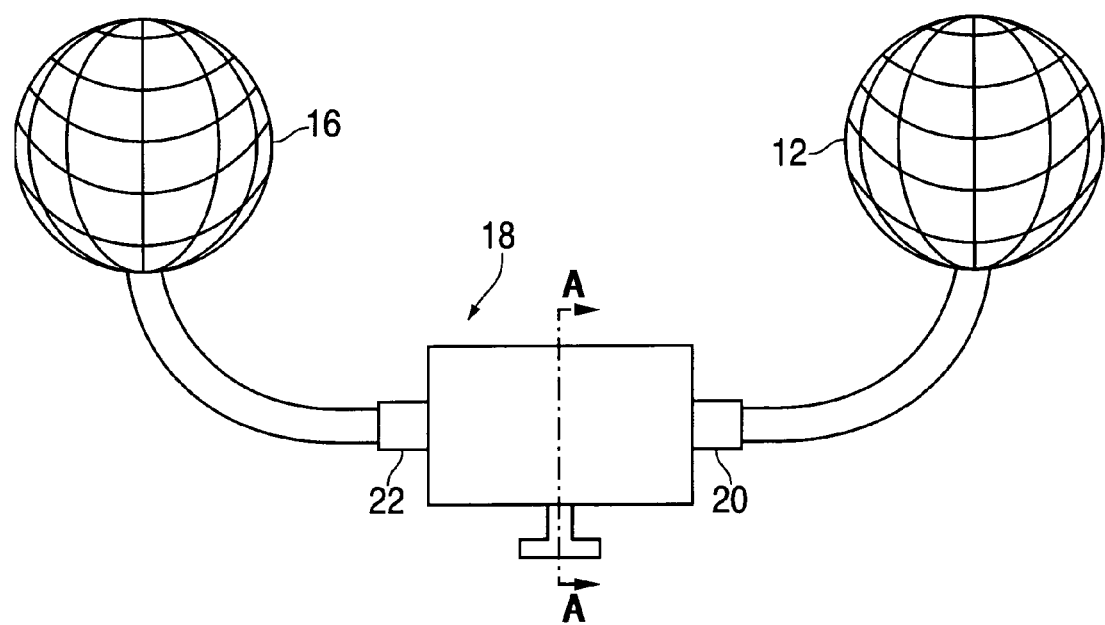
FIG. 2 shows an inflator according to an embodiment of the present invention.

Referring now to FIG. 2, an embodiment of the inflator 18 is shown. The indoor 18 bas first and second gas outputs 20, 22, connected respectively to airbags 12, 16. The gas outputs 20, 22 may be located at opposite cis of the indoor 18, and may be configured to direct their respective gas outputs in substantially opposite direction. The inflator 18 is configured to provide a first gas flow rate from the first gas output 20 that may be different from a second gas flow rate from the second gas output 22, so that airbag 12 may be inflated at a different rate than airbag 16. A benefit to such an embodiment is, e.g., if airbags 17, 16 arc of different sizes, providing a differential gas flow rate, proportional to their size, allows the airbag 12, 16 to inflate in approximately the same amount of time. In a preferred embodiment, inflator 18 is capable of providing a ratio of first gas flow rate to second gas flow rate of between 1.5 and 3.0, preferably around 2.0.

Figure 3A:
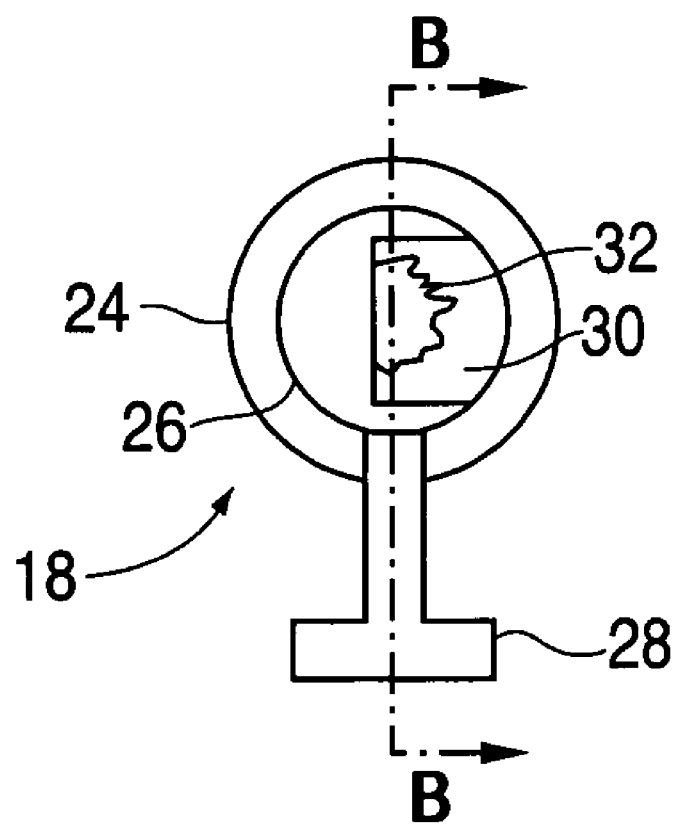
FIG. 3a shows a cross section through section A-A of the inflator shown in FIG. 2.

Referring now to FIG. 3a, which shows a cross section of the inflator 18 in FIG. 2 tough section A-A, one possible embodiment for causing a differential gas flow rate is shown. As understood by one of ordinary skill in the art, a wide range of possible solutions (e.g. mechanical, electrical, electric, pneumatic, hydraulic, etc.) may be implemented to cause a differential gas flow rate from gas outputs 20, 22. However, only a single embodiment will be explained herein for simplicity. In FIG. 3a, the inflator 18 has a wall 24 which may be cylindrical in shape. Inside the wall 24 is a preferably approximately spherical valve portion 26 that is connected to a handle 28, thus allowing the valve portion 26 to rotate inside wall 24 due to turning of the handle 28. Once again, handle 28 is merely an illustration; it may be, e.g., an electrical or pneumatic actuator. Valve portion 26 includes a groove or cut-out 30 as shown. Valve portion 26 may also be substantially hollow (such as with a substantially spherical inner space) configured to accommodate or hold a quantity of a pyrotechnic chemical 32, such as a deflagrating decomposition compound (e.g., smokeless powder) or a deflagrating mixture (e.g., black powder). Pyrotechnic chemicals for airbag inflators are well known in the art, and pyrotechnic chemical 32 may include any of those chemicals known in the art.

Figure 3B:
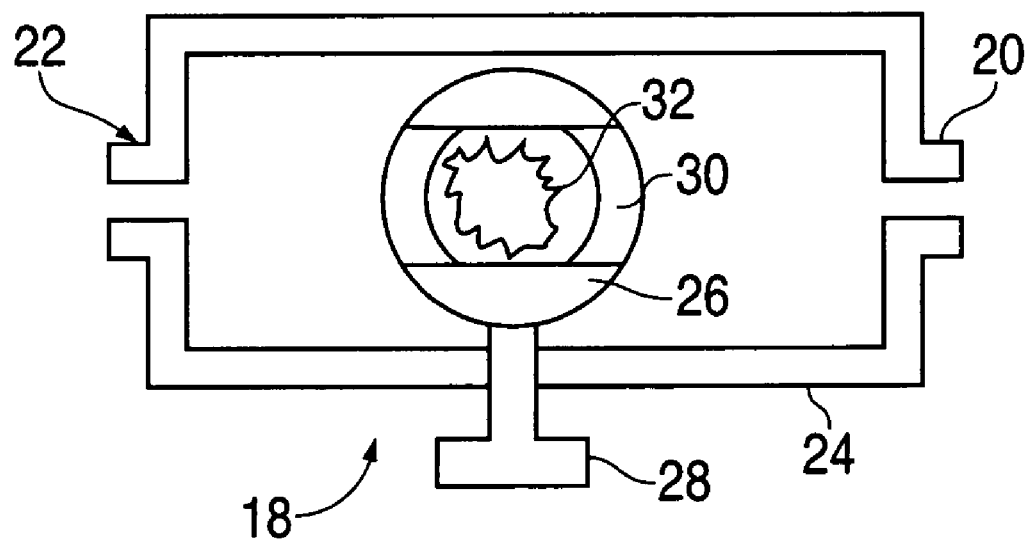

FIG. 3b shows a cross section of the inflator 18 shown in FIG. 3a through section B-B. In both FIGS. 3a and 3b, the valve portion 26 is shown in a fully open configuration—i.e., the groove 30 is approximately parallel to the length of inflator 18—so that upon ignition of pyrotechnic chemical 32, hot combustion/decomposition gas flows approximately equally to the left side (toward second gas output 22) and hie right side (toward first gas output 20) of the inflator 18. ("Right" and "left" are used with respect to orientation of FIG. 3b.) It will be easily understood by one of ordinary skill in the art that by turning handle 28, the relative gas tow rates to the left and right sides of the for 18 will charge. For exile, if the handle 28 is turned so that groove 30 in valve portion 26 faces more in the right direction, the groove 30 will provide a small opening into the left portion of inflator 18, so that a lager proportion of the hot gas generated by chemical 32 will flow toward the first gas output 20 that the second gas output 22. Similarly, if the handle 28 is rotated a full 90°, so that the groove is approximately perpendicular to the length of inflator 18, the groove does not provide any flow area through which gas can flow, so that 100% of the gas generated by chemical 32 will flow to and through fist gas output 20, and 0% will flow to second gas output 22. Alternatively, handle 28 could be turned so that groove 30 faces toward the left side of indoor 18, to increase the gas flow rate to second gas outlet 22 over first gas outlet 20.

FIGS. 9-19 disclose further alternative embodiments of inflator valve mechanisms that may be employed to provide a differential gas flow rate and supply.

Figure 9:
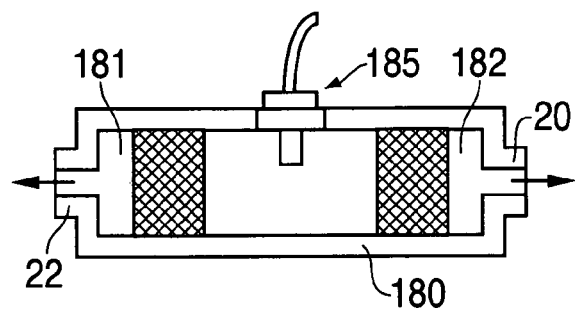
FIG. 9 is a longitudinal cross-sectional view of an embodiment to an inflator of the present invention.

As shown in FIG. 9, the inflator 18 may include a squib 185. As described above, the inflator includes gas outlets 20, 22 through which gas is introduced into the airbag(s). The inflator 18 may further include valve mechanisms for controlling the flow of the inflation gas. The valve mechanisms may be positioned adjacent one or both of the inflation gas outlets at locations designated by reference numerals 181 and 182.

Figures 10A, 10B, 10C:
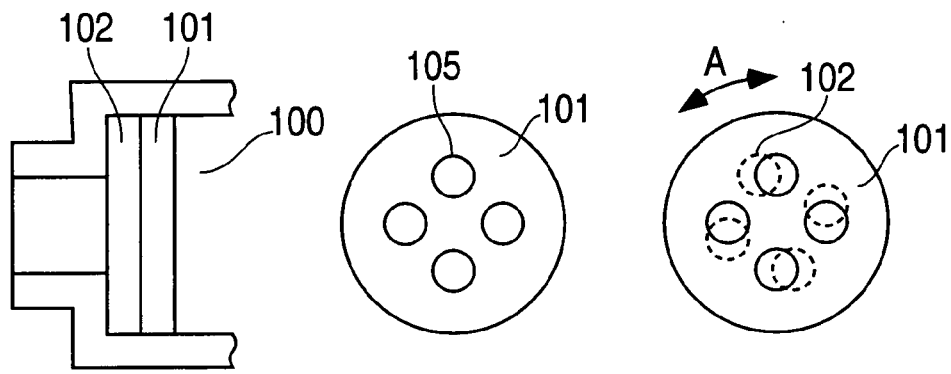
FIG. 10(a), 10(b) and 10(c) show side and end views of am inflator valve mechanism according to an embodiment of the present invention.

As shown in FIGS. 10(a)-10(c) an embodiment of the valve mechanism 100 may include a plurality of disc shaped flow restrictors 101, 102. Each flow restrictor 101, 102 may include several openings 105 to it the flow of gas through the restrictors 101, 102. The valve mechanism is configured to permit relative rotation A between the flow restrictors 101, 102 to control the flow of gas through the openings 105. For example as shown in FIG. 10(c) one or both of the discs 101, 102 may be rotated to misalign the openings 105 and restrict gas flow therethrough. One or both the flow restrictors 101, 102 may be configured to rotate.

Figure 11:
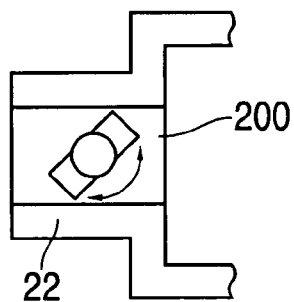
FIG. 11 is a side view of an alternative embodiment of an inflator valve mechanism.
Figure 12:
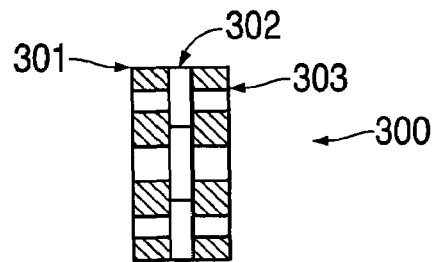
FIG. 12 is a cross-sectional view of an alternative embodiment of a inflator valve mechanism.
Figure 13:
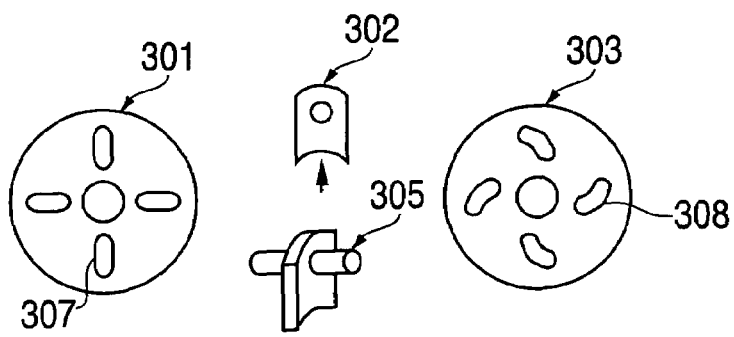
FIG. 13 is an exploded view of the inflator valve mechanism of FIG. 12.
Figure 14:
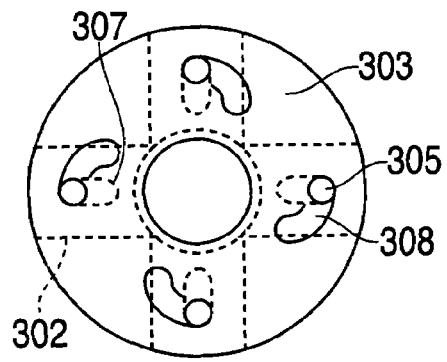
FIG. 14 is an end view of the inflator valve mechanism of FIG. 12.

FIG. 11 discloses another embodiment of a valve mechanism 200. The valve mechanism may be a rotatable buttery or flop type valve 200. As shown in FIG. 11, the valve may rotate to an in-line position to put flow out of the inflator gas outlet 22. Alternatively, the valve may rotate to a position which obstructs or blocks the flow of as, such as shown in FIG. 11 for example, in order to further reduce the gas flow out of the inflator. Movement of the valve may be driven manually or by a solenoid or motor or any other suitable valve operating mechanism FIG. 12-14 disclose yet another embodiment of a valve mechanism according to the present invention. As shown in FIG. 13p, the valve mechanism 300 may include a restrictor disc 301, linking block 302 and pin 305, and cam plate 303. The mechanism 300 is configured to adjustably restrict gas flow through the openings 307 in the restrictor plate 301. The restrictor disc 301 and cam plate 303 are linked together by at least one liming block 302. Each lin block 302 includes pins 305 that engage openings 307, 308 in the restrictor disc 301 and cam plate 303. Rotation of the cam plate 303 will cause corresponding movement in the linking block 302 to thereby change the area of the gas passages through the openings of the plates.

Figure 15:
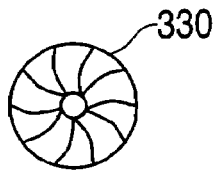
FIG. 15 is art end view of an adjustable valve mechanism according to an alternative embodiment of the present invention.

As shown in FIG. 15, according to another embodiment of the present invention, a camera type adjustable aperture 330 could also be used as the valve mechanism.

Figure 16:
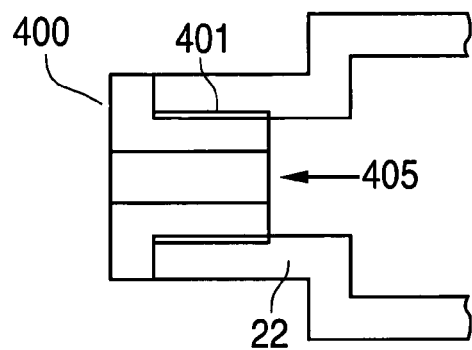
FIG. 16 is a cross-section view of an alternative embodiment of an inflator valve mechanism.

FIG. 16 discloses another embodiment of a valve mechanism 400, according to the present invention. The valve mechanism 400 can include an insert or screw 401. The inset 401 is attached to or threadably connected to a gas outlet 22 of an inflator 18. The insert 401 is configured to adjustably restrict gas now though the gas outlet 22. The insert 401 includes an office 405 extending through the insert 401. The size of the orifice 405 can be varied to adjust the flow of gas.

Figure 17:
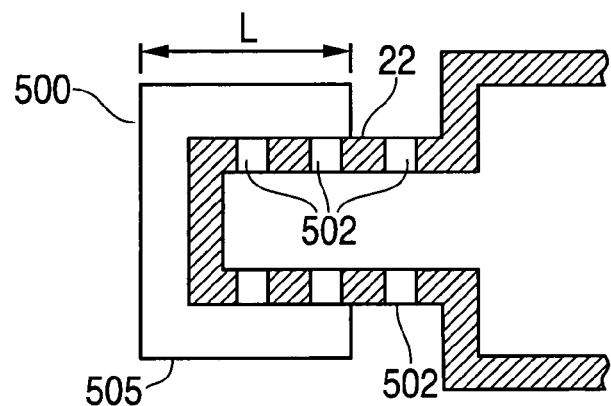
FIG. 17 is a cross-sectional view of yet another alternative embodiment of an inflator valve mechanism.

As shown in FIG. 17, a valve mechanism 500 according to another embodiment of the present invention includes a gas outlet 22 that includes a plurality of openings 502. The openings 502 are spaced along the outlet 22 at intervals. The valve mechanism 500 further includes a cap 505 that inset over and around the gas outlet 22. The length L of the cap 505 determines the number of openings 502 that a covered, which controls the amount of gas flow out of the outlet 22. The cap 505 can be varied in length L and/or the number and spacing of the open gas 502 can be varied to adjust the flow rate.

Figure 19:
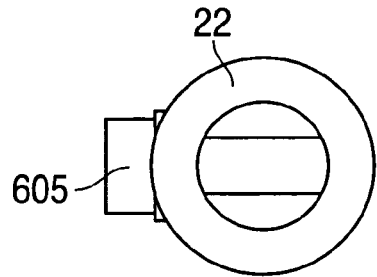
FIG. 19 is an end view of the valve mechanism of FIG. 18.
Figure 18:
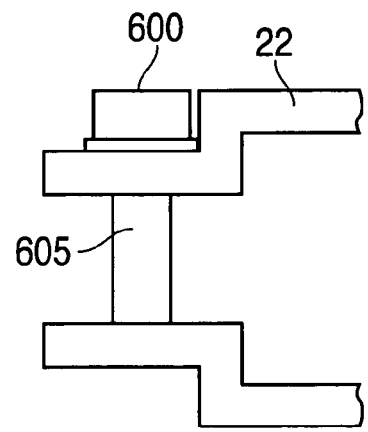
FIG. 18 is a side view of an alternative embodiment of an inflator valve mechanism.

FIGS. 18-19 disclose yet another embodiment of a valve mechanism 600 according to the present invention. As shown in FIG. 18, the valve mechanism 600 may include a pin 605. The pin 605 extends trough the gas outlet 22. The extension of the pin 605 through the gas outlet 22 restricts the passage of gas, as can be seen in FIG. 19. The size of the pin 605 can also be varied to adjust the flow of gas through the outlet 22.

The inflator 18 is connected to a control circuitry (not sown) that includes a collision detector (such as an accelerometer), and the inflator 18 is configured to ignite the pyrotechnic chemical 32 upon receiving the appropriate signal from the control circuitry.

Figure 4:
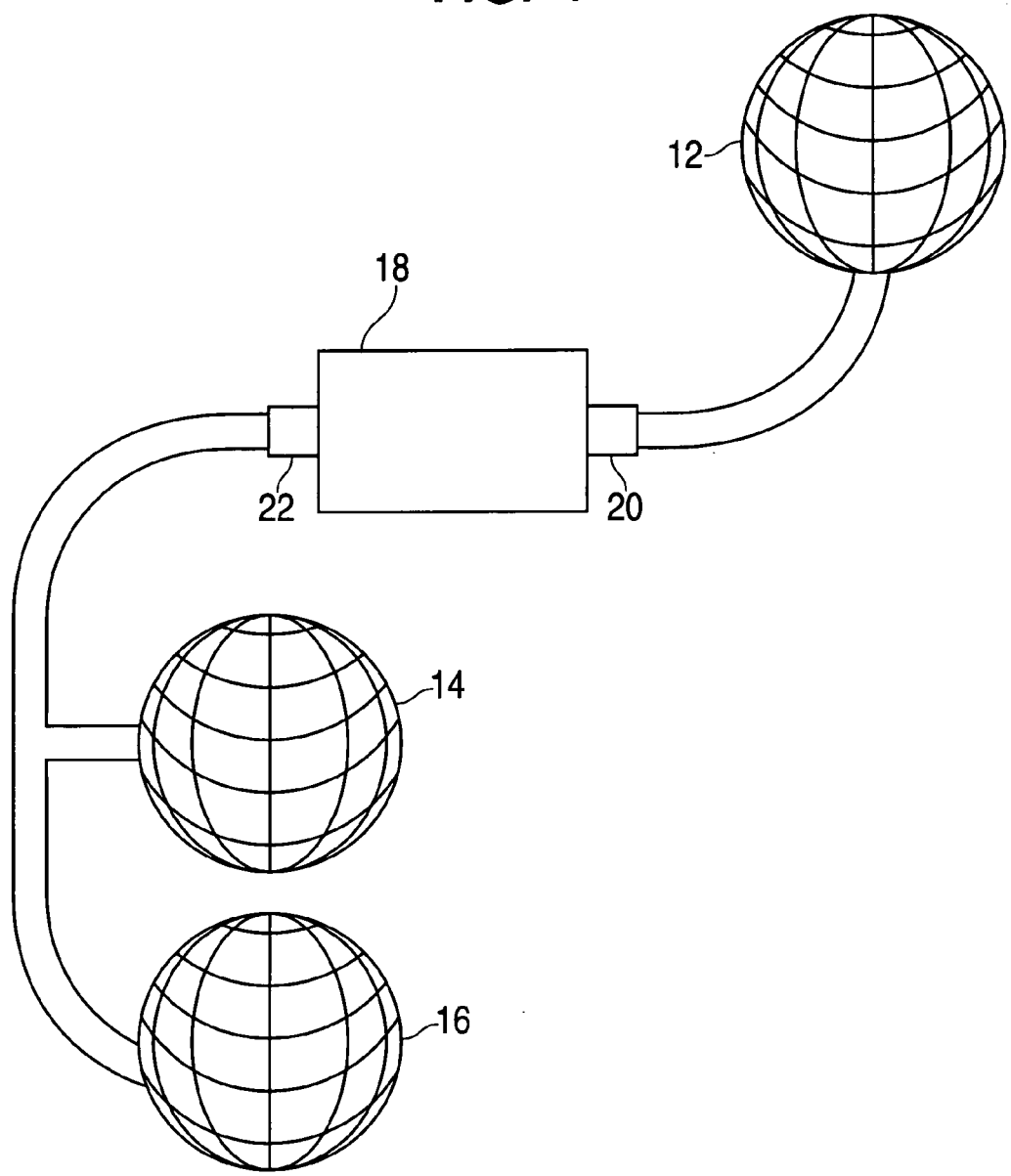
FIG. 4 shows an inflator according to another embodiment of the present invention

Referring now to FIG. 4, inflator 18 is shown connected to airbag 12 by f gas output 20, and to airbags 14, 16 by second gas output 22. In this embodiment, there is no means by which to adjust the relative gas flow rates to airbag 14 versus to airbag 16, but inflator 18 is configured to allow an adjustment of the relative gas flow rates to airbag 12 versus to both airbags 14, 16.

Figure 5:
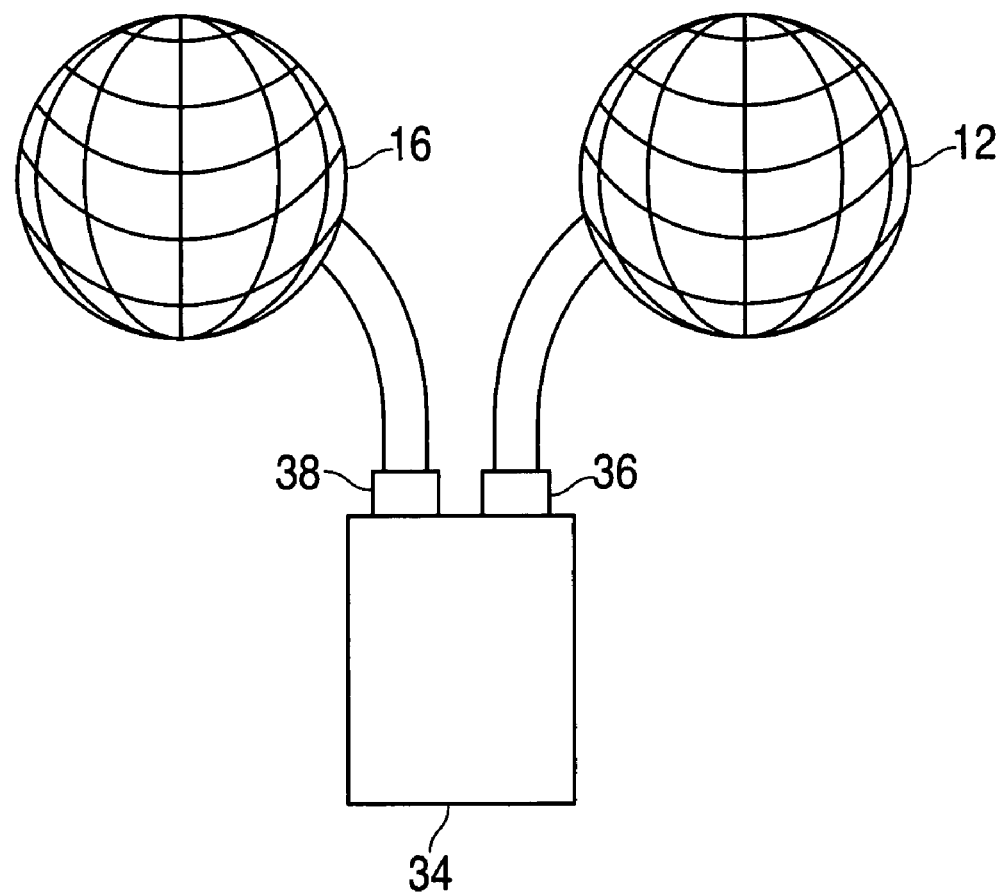
FIG. 5 shows an inflator according to another embody of the present invention.

Referring now to FIG. 5, a inflator 34 is similar to inflator 18 shown in FIG. 2, except that it has first and second gas outputs 36, 38 that arm located on a same side of the inflator 34, and at configured to direct their respective gas outputs in substantially the same direction.

Figure 6:
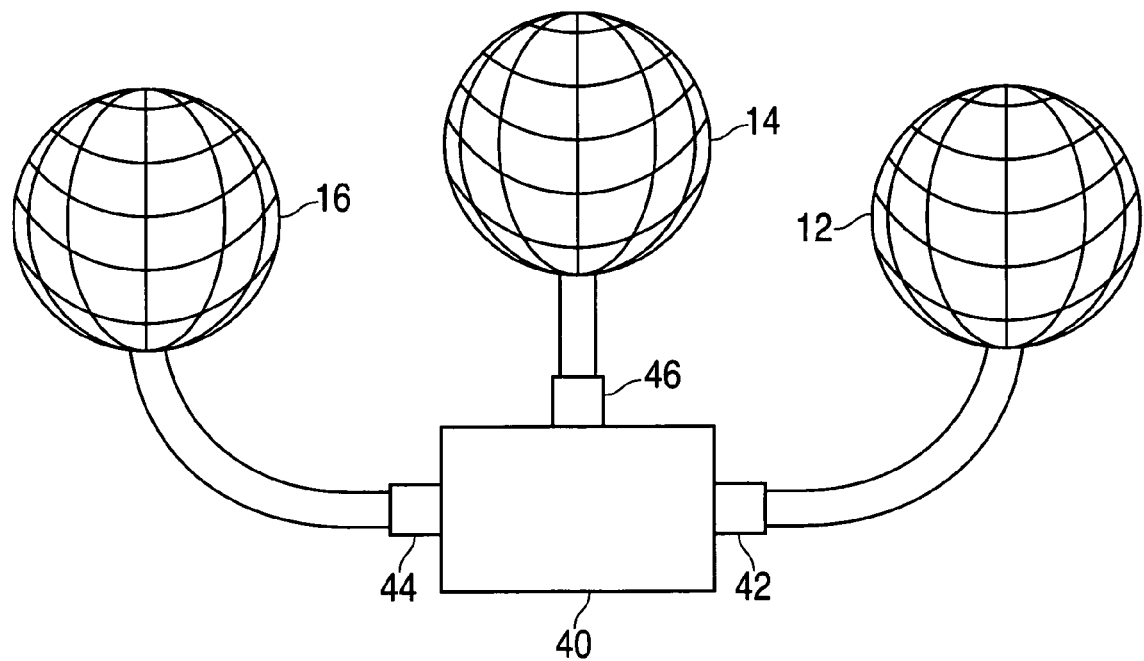
FIG. 6 shows an inflator according to another embodiment of the present invention.

Referring now to FIG. 6, an inflator 40 has first second, and third gas outputs 42, 44, 46 connected respectively to airbags 12, 16, 14. Inflator 40 may be configured to allow an adjustment of the relative gas flow rates from each of the gas outputs 42, 44, 46. A variety of possible means for doing so will be understood by one of ordinary skill in the art, and further detail will be omitted. An advantage to the embodiment shown in FIG. 6 is that, in the case where all three airbags 12, 14, 16 have different sizes, the inflator 18 can provide corresponding proportional gas flow rates to the airbags 12, 14, 16 to thus inflate them in approximately the same amount of time.

Given the disclosure of the present invention, versed in the art would appreciate that there may be other embodiments and modifications within the scope and spirit of the invention. For example, the features of the present invention set forth above may be included in existing safety systems. For example, the inflators (and other features of the preset invention) describe above could be incorporated into the system disclosed in U.S. Patent Application Publication 2003/0230872 A1 (incorporated by reference herein in its entirety). Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inflator comprising first, second, and third gas outputs, wherein the inflator is configured to generate gas and to release the gas through the first gas output with a first gas flow rate and to release the gas through the second gas output with a second gas flow rate different from the first gas flow rate, and wherein the inflator is configured to release the gas through the third gas output with a third gas flow rate, wherein the inflator is configured so that a ratio of the third gas flow to the second gas flow rate is not adjustable, but a ratio of the second gas flow rate to the first gas flow rate is adjustable.

2. The inflator as claimed in claim 1, wherein the inflator is configured to release the gas through the first gas output in a first direction and to release the gas through the second gas output in a second direction substantially opposite the first direction.

3. The inflator as claimed in claim 1, wherein the inflator is configured to release the gas through the first gas output in a first direction and to release the gas through the second gas output in a second direction substantially the same as the first direction.

4. The inflator as claimed in claim 1, wherein the first and second gas outputs are located at substantially opposite ends of the inflator.

5. The inflator as claimed in claim 1, wherein a ratio of the first gas flow to the second gas flow rate is between 1.5 and 3.0.

6. The inflator as claimed in claim 1, wherein a ratio of the first gas flow to the second gas flow rate is 2.

7. The inflator as claimed in claim 1, further comprising a valve mechanism for controlling gas flow out of at least one of the first and second gas outputs.

8. A vehicle occupant protection system, comprising:
an inflator having at least first and second gas outputs, the inflator configured to generate gas and to release the gas through the first gas output with a first gas flow rate and to release the gas through the second gas output with a second gas flow rate different from the first gas flow rate;
a first air bag connected to the first gas output;
a second air bag connected to the second gas output; and
a seat belt configured to restrain a vehicle occupant, wherein the second air bag is a seat belt air bag connected to the seat belt;
wherein the second air bag is connected to the second gas output, and further comprising: a third air bag connected to the second gas output; and a seat belt configured to restrain a vehicle occupant and comprising a shoulder belt and a lap belt, wherein the second air bag is a shoulder belt air bag connected to the shoulder belt and the third air bag is a lap belt air bag connected to the lap belt.

9. A vehicle occupant protection system, comprising:
an inflator having at least first and second gas outputs, the inflator configured to generate gas and to release the gas through the first gas output with a first gas flow rate and to release the gas through the second gas output with a second gas flow rate different from the first gas flow rate;
a first air bag connected to the first gas output;
a second air bag connected to the second gas output; and
a seat belt configured to restrain a vehicle occupant, wherein the second air bag is a seat belt air bag connected to the seat belt;
wherein the inflator is configured to release the gas through the first gas output in a first direction and to release the gas through the second gas output in a second direction substantially opposite the first direction.

10. A vehicle occupant protection system, comprising:
an inflator having at least first and second gas outputs, the inflator configured to generate gas and to release the gas through the first gas output with a first gas flow rate and to release the gas through the second gas output with a second gas flow rate different from the first gas flow rate;
a first air bag connected to the first gas output;
a second air bag connected to the second gas output; and
a seat belt configured to restrain a vehicle occupant, wherein the second air bag is a seat belt air bag connected to the seat belt;
wherein the first and second gas outputs are located at substantially opposite ends of the inflator.

11. A vehicle occupant protection system, comprising:
an inflator having at least first and second gas outputs, the inflator configured to generate gas and to release the gas through the first gas output with a first gas flow rate and to release the gas through the second gas output with a second gas flow rate different from the first gas flow rate;
a first air bag connected to the first gas output;
a second air bag connected to the second gas output; and
a seat belt configured to restrain a vehicle occupant, wherein the second air bag is a seat belt air bag connected to the seat belt;
wherein the inflator has a third gas output and is configured to release the gas through the third gas output with a third gas flow rate, wherein the inflator is configured so that a ratio of the third gas flow to at least one of the first and second gas flow rates is adjustable.

12. A vehicle occupant protection system, comprising:
an inflator having at least first and second gas outputs, the inflator configured to generate gas and to release the gas through the first gas output with a first gas flow rate and to release the gas through the second gas output with a second gas flow rate different from the first gas flow rate;
a first air bag connected to the first gas output;
a second air bag connected to the second gas output; and
a seat belt configured to restrain a vehicle occupant, wherein the second air bag is a seat belt air bag connected to the seat belt;
wherein the inflator has a third gas output and is configured to release the gas through the third gas output with a third gas flow rate, wherein the inflator is configured so that a ratio of the third gas flow to the second gas flow rate is not adjustable, but a ratio of the second gas flow rate to the first gas flow rate is adjustable.

* * * * *